US010438289B1

United States Patent
Gipson et al.

(10) Patent No.: US 10,438,289 B1
(45) Date of Patent: Oct. 8, 2019

(54) SYSTEMS AND METHODS FOR RETIREMENT PLANNING

(71) Applicant: UIPCO, LLC, San Antonio, TX (US)

(72) Inventors: Zachary A. Gipson, Shavano Park, TX (US); Eric M. Engquist, Canyon Lake, TX (US); Richard Martinez, San Antonio, TX (US); Melisa Izaguirre, Boerne, TX (US); Ron'Dell Harley, San Antonio, TX (US); Lea B. Sims, San Antonio, TX (US); Jackie L. Gilmore, New Braunfels, TX (US); Tim Haverly, San Antonio, TX (US); Brian F. Wilson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 387 days.

(21) Appl. No.: 15/273,952

(22) Filed: Sep. 23, 2016

Related U.S. Application Data (60) Provisional application No. 62/234,834, filed on Sep. 30, 2015.

(51) Int. Cl.
*G06Q 40/00* (2012.01)
*G06Q 40/06* (2012.01)

(52) U.S. Cl.
CPC ............. *G06Q 40/06* (2013.01); *G06Q 40/00* (2013.01)

(58) Field of Classification Search
CPC ................................ G06Q 40/00; G06Q 40/06
See application file for complete search history.

(56) References Cited

U.S. PATENT DOCUMENTS

| | | | | |
|---|---|---|---|---|
| 7,962,394 | B2 * | 6/2011 | Wagner | G06Q 40/00 705/35 |
| 8,892,467 | B1 * | 11/2014 | Ball | G06Q 40/00 705/35 |

OTHER PUBLICATIONS

David F. Burrelli and Barbara Salazar Torreon, Military Retirement: Background and Recent Developments, Jan. 27, 2014, Congressional Research Service, web, 1-16 (Year: 2014).*

* cited by examiner

*Primary Examiner* — I Jung Liu
(74) *Attorney, Agent, or Firm* — Perkins Coie LLP (57) ABSTRACT

Methods and systems disclosed herein assist users in determining when to retire from a first career and how to allocate retirement funds from the first career. The user may set retirement goals and select a retirement date for the first career. The system may estimate a retirement income for the first career. The user may indicate the payment schedule in which the user will receive the first career retirement funds. The user may provide, or the system may collect from other sources, information regarding other assets and debts associated with the user. Thereafter, the user may be provided information regarding the second career needed to meet the retirement goals and advice regarding the retirement from the first career, including the retirement payout.

11 Claims, 7 Drawing Sheets

SYSTEMS AND METHODS FOR RETIREMENT PLANNING

CROSS-REFERENCE TO RELATED APPLICATIONS

This application is a non-provisional of and claims priority to U.S. Provisional Application No. 62/234,834, filed on Sep. 30, 2015, entitled "SYSTEMS AND METHODS FOR RETIREMENT PLANNING," which is hereby incorporated by reference in its entirety for all purposes.

TECHNICAL FIELD

Various embodiments of the present disclosure generally relate to financial planning. More specifically, various embodiments of the present disclosure relate to methods and systems for planning retirement from a first career.

BACKGROUND

Retirement planning, in a financial context, refers to the allocation of savings or revenue for retirement. Generally, the goal of retirement planning is to achieve the state of having sufficient personal wealth to live, without having to work actively for basic necessities. The process of retirement planning aims to assess readiness to retire at a specified age and standard of living, identify actions to improve readiness-to-retire, and encourage saving practices.

BRIEF DESCRIPTION OF THE DRAWINGS

Embodiments of the present disclosure will be described and explained through the use of the accompanying drawings in which.

DETAILED DESCRIPTION

Various embodiments of the present disclosure generally relate to financial planning. More specifically, various embodiments of the present disclosure relate to methods and systems for planning retirement from a first career when a second career is contemplated.

Many people have multiple careers, with employers offering retirement packages to employees who stay for a minimum length of time. Many times, those who serve in the military retire and transition to a second career. Current financial planning tools do not calculate the first retirement as part of a holistic retirement plan. That is, current tools do not assist users with determining when to retire from a first career, how to determine a payment schedule for the retirement funds from the first career, among other decisions. Moreover, current retirement planning tools are not integrated with other tools that may provide assistance to a person starting an entirely new career.

Methods and systems disclosed herein assist users in determining when to retire from a first career and how to allocate retirement funds from the first career. In some embodiments, the first career may be a career in the military. The user may set retirement goals and select a retirement date for the first career. The system may estimate a retirement income for the first career (e.g., pension). The user may indicate the payment schedule in which the user will receive the first career retirement funds. In some embodiments, if the user chooses to receive the funds earlier, the user may receive a total reduction in funds. The system may allow the user to select how much of the first career retirement funds will be put towards the overall retirement plan. The user may provide, or the system may collect from other sources, information regarding other assets and debts associated with the user.

In order to advise the user on how to meet the retirement goals set forth by the user, the system can calculate a salary needed in a second career and/or an level of assets and debts. Should this salary or level of assets/debts be above a threshold (or sometimes as a matter of course as a service to the user), the system may revise the first career retirement income by changing the factors (e.g., date of retirement, payment schedule for retirement funds) and may provide advice and recommendations to the user. For example, the system may revise and recalculate the first career retirement income based on the salary needed in the second career or the expected expenses the user may have at a specified retirement age. The user may be provided with a table outlining the options with a recommendation and a chart showing the growth of the user's overall retirement with relation to a secondary retirement from the second career based on retirement age. The user may be transitioned to a tool that assists the user with transitioning from the military career. Such services may include advice for healthcare, relocation, education, and second careers.

This disclosure describes financial planning for multiple careers. Various embodiments may provide one or more of the following technological improvements: 1) improved financial planning, 2) improved processes for determining salaries for a second career upon completion of a first career in a single platform, 3) improved advice for planning a retirement date from a first career and transitioning to a second career, and 4) improved advice for planning how to select a payout schedule from a first retirement based on retirement goals.

In the following description, for the purposes of explanation, numerous specific details are set forth in order to provide a thorough understanding of embodiments of the present disclosure. However, it will be apparent to one skilled in the art on reading the disclosure that embodiments may be practiced without some of these specific details. For example, the disclosure specifically mentions a military career as a first career; however, embodiments of the present disclosure may apply equally to any first career.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic device) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 1:
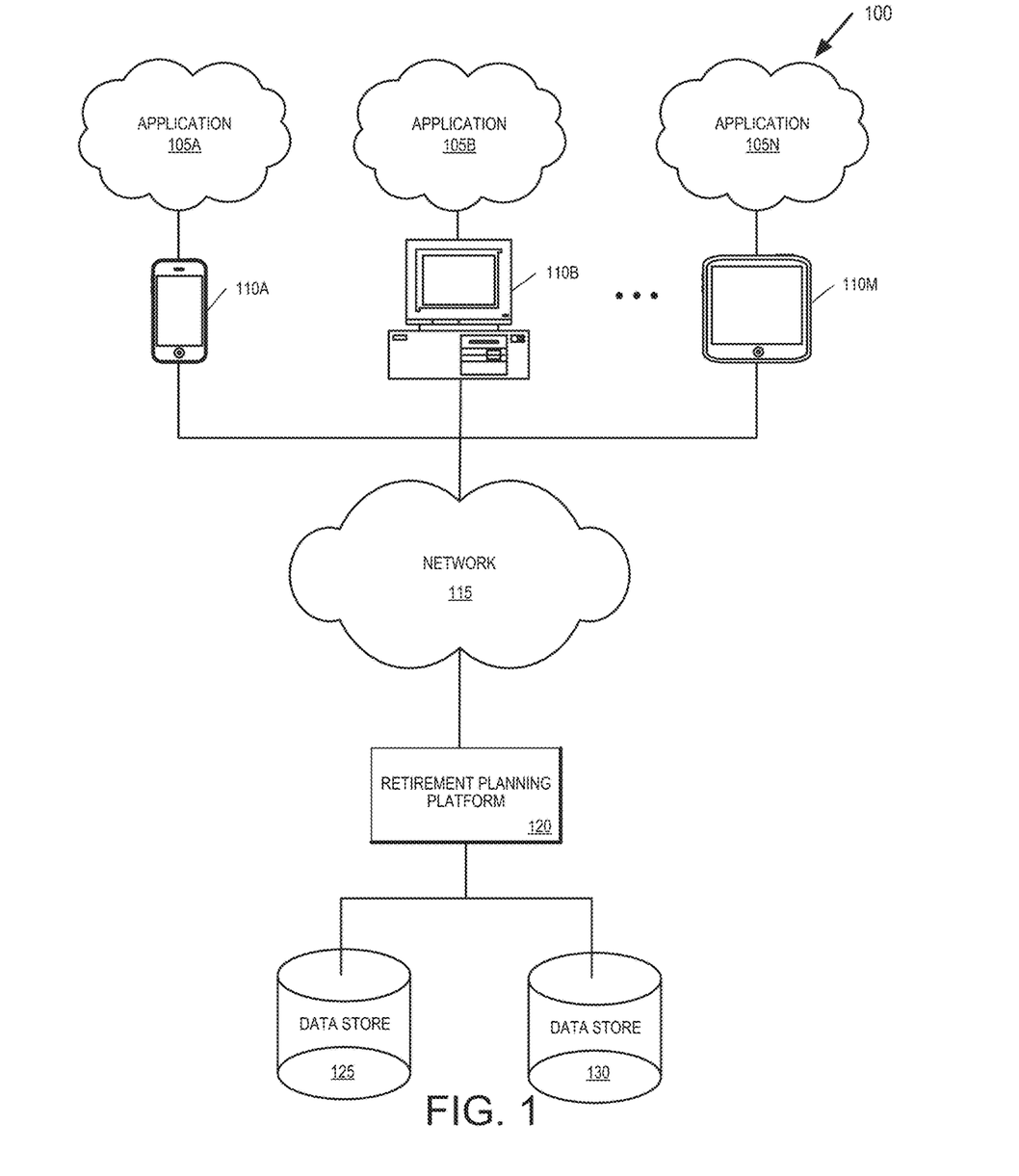
FIG. 1 illustrates an example of a network-based operating environment in accordance with various embodiments of the disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; a wearable device such as a smartwatch). In some embodiments, applications 105A-105N may be stored on one or more computing devices 110A-110M or may be stored remotely on a server (in the "cloud"). These computing devices can include mechanisms for receiving and sending traffic by connecting through network 115 to retirement planning platform 120 and data stores 125 and 130.

Computing devices 110A-110M may be configured to communicate via the network 115 with retirement planning platform 120. In some embodiments, computing devices 110A-110M can retrieve or submit information to retirement planning platform 120 and run one or more applications with customized content retrieved by retirement planning platform 120 and data stores 125 and 130. For example, computing devices 110A-110M can execute a browser application or a customized client to enable interaction between the computing devices 110A-110M, retirement planning platform 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Retirement planning platform 120 can run on one or more servers and can be used to receive or suggest retirement goals, receive retirement information for one or more careers, receive information regarding a spouse's retirement information, receive military service information, calculate various military retirement incomes, calculate a salary for a second career, optimize retirement income, calculate social security payments based on a first career and a second career, send users to targeted programs, store profiles and/or policies in data stores 125 and 130, and/or perform other activities. In some embodiments, retirement planning platform 120 includes various data processing and analytic tools that allow for retirement calculations and advice. In some embodiments, retirement planning platform 120 is a server.

Retirement planning platform 120 may be communicably coupled with data stores 125 and 130 and computing devices 110A-110M, and may communicate, access, or receive data (e.g., salary information, military status, marital status, retirement goals) from computing devices 110A-110M and data stores 125 and 130. Retirement planning platform 120 may be associated with a membership organization, and the users may be members of the membership organization. The organization may be a financial institution and/or an insurance company.

Retirement planning platform 120 may be customized or calibrated by individual companies or service providers based on user needs and/or business objectives. For example, companies may have different business rules, and/or different criteria for determining second salary information and providing retirement advice.

Data stores 125 and 130 can be used to manage storage of and access to user data such as employment information, marital status, current savings, retirement savings, age, credit score, and outstanding debts. Data stores 125 and 130 may be a data repository of a set of integrated objects that are modeled using classes defined in database schemas. Data stores 125 and 130 may further include flat files that can store data. Retirement planning platform 120 and/or other servers may collect and/or access data from the data stores 125 and 130.

Figure 2:
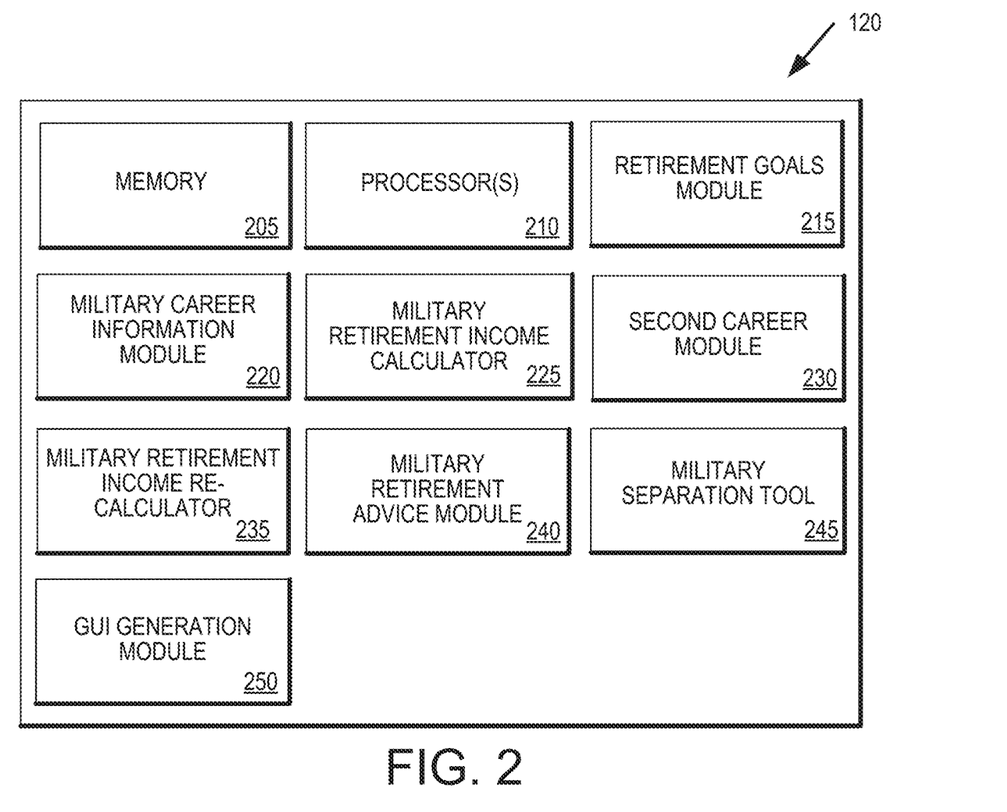
FIG. 2 illustrates various components of a retirement planning platform that may be used in accordance with various embodiments of the present disclosure.

FIG. 2 illustrates a set of components within retirement planning platform 120 according to one or more embodiments of the present disclosure. According to the embodiments shown in FIG. 2, retirement planning platform 120 can include memory 205, one or more processor(s) 210, retirement goals module 215, military career information module 220, military retirement income calculator 225, second career module 230, military retirement income re-calculator 235, military retirement advice module 240, military separation tool 245, and graphical user interface (GUI) generation module 250. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, military retirement income re-calculator 235 and military retirement advice module 240 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of retirement goals module 215, military career information module 220, military retirement income calculator 225, second career module 230, military retirement income re-calculator 235, military retirement advice module 240, military separation tool 245, and GUI generation module 250.

Retirement goals module 215 can receive, suggest, recommend, and process retirement goals for users. The goals may include a standard of living, monthly income from retirement income sources, value of assets in particular accounts (e.g., Roth IRA, 401k), and level of monthly expenses. Retirement goals module 215 may suggest goals based on factors such as the user's age and expected place of retirement.

Military career information module 220 can collect and/or receive military career information such as whether the user is currently enlisted or has ever been enlisted in the military, his branch of service, her current military status, the planned retirement year, and the military retirement income. Some items are calculated by military retirement income calculator 225, and some are input by the user.

Military retirement income calculator 225 can calculate military retirement income based on expected pay grade at retirement, expected retirement points, expected years of service at retirement, payout schedule of military retirement annuity plan (e.g., lump sum, partial lump sum), and whether the user's spouse has a survivor benefit plan. In some embodiments, certain information need not be known and/or can be extracted from other information. For example, if the start date of the user's employment is known and the user provides an expected military retirement date, the system can determine the years of service at retirement. In other embodiments, an expected pay grade at retirement can be estimated from a number of years of service (erring on the lower end of the paygrade if the paygrade is unknown).

Second career module 230 estimates a salary needed for a second career to meet the user's retirement goals by taking into consideration the user's first career with the military. Because people who serve in the military often retire well before typical retirement age, many of these retirees will begin second careers but may not have a sense of how much money they need to earn to pay current bills and stay on track for retirement.

Military retirement income re-calculator 235 can adjust factors that influence the military retirement income such as expected date of retirement and payout schedule of military retirement annuity to determine a new salary for a second career. For example, the user may have selected that they would like 40% of their retirement paid out in a lump sum and the remainder (after being penalized) put towards an overall retirement plan. Military retirement income re-calculator 235 may adjust the payout schedule (e.g., 10% paid out in a lump sum and the remainder put towards the overall retirement plan) and recalculate salary for the second career and expected retirement funds at the specified retirement date from the second career.

Military retirement income re-calculator 235 may provide these re-calculations in response to a salary for a second career being above a threshold salary, when the user wishes to take a certain amount of lump sum payout at a certain age (e.g., 30% at an expected military retirement age of 37), as a matter of course, etc. For example, military retirement income re-calculator 235 may provide a chart showing salaries with variables such as length of service and monthly payout schedule for the retirement annuity. Military retirement advice module 240 can show the growth of the user's overall retirement with relation to a secondary retirement from the second career based on retirement age.

Military retirement advice module 240 can provide advice or recommendations regarding the payout schedule for the military retirement annuity, military retirement date, and salary of the user's second career based on the user's financial goals, and, in some cases based on the user's skill set.

Military separation tool 245 can provide assistance for military members who are considering retirement. Items such as where to live, career opportunities, education, and health care may be brought up with considerations and recommendations in military separation tool 245.

GUI generation module 250 can generate one or more GUI screens that allow for interaction with a user. In at least one embodiment, GUI generation module 250 generates a graphical user interface for receiving and/or conveying information to the user. For example, the GUI generation module 250 may display information regarding various military retirement dates, monthly payout schedules, salaries for a second career, expenses, and retirement goals.

Figure 3:
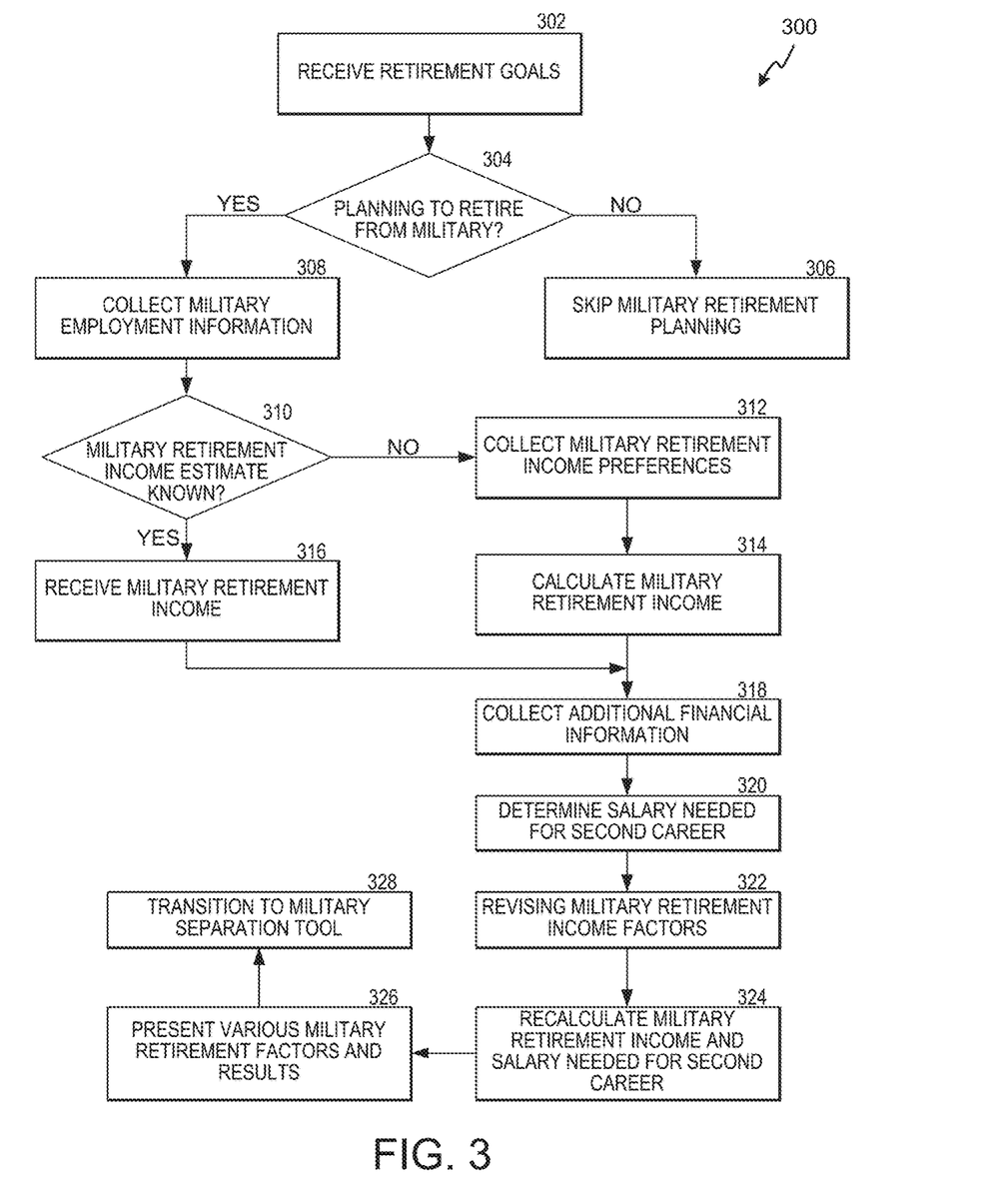
FIG. 3 is a flowchart illustrating a set of operations for planning for retirement from a first career in accordance with various embodiments of the disclosure.

FIG. 3 is a flowchart illustrating sets of operations 300 for planning for retirement from a first career. In some embodiments, fewer than all of the operations are performed, whereas in other embodiments additional operations are performed. Moreover, in some embodiments, the operations are performed in different orders or in parallel. The operations can be performed by the components illustrated in FIG. 1 and/or various components of retirement planning platform 120 illustrated in FIG. 2.

Receiving operation 302 receives retirement goals from a user. The retirement goals may be received via a communications network from a device associated with a user. The retirement goals may include a standard of living, expenses during retirement, monthly income, and retirement age. Decision operation 304 determines whether the user is planning to retire from the military. This information may be gathered from a database or input by the user. If the user responds that the user is not planning to retire from the military (or if previously collected information shows that the user is not currently enlisted or has never been enlisted in the military), decision block 304 branches to skipping operation 306, where the tool does not inquire further about a first career (in this example, a military career).

On the other hand, if the user plans to retire from the military, decision operation 304 branches to collecting operation 308 where the user's military employment information is collected. Military employment information may include a start date with the military, branch of service, current military status (e.g., reserve, active), and planned retirement year.

Decision operation 310 determines whether the user can estimate a military retirement income. If the user cannot estimate a military retirement income, decision operation 310 branches to collecting operation 312 where military retirement income preferences and parameters are calculated. For example, the user may input an expected pay grade at retirement, expected retirement points, expected years of service at retirement, and a payout schedule for the military retirement. Based on some or all of this information, the user's military retirement income preferences are calculated in calculating operation 314. If the user already has a retirement income estimate, decision operation 310 branches to receiving operation 316 where the user provides an estimate of the user's military retirement income.

Both receiving operation 316 and calculating operation 314 are followed by collecting operation 318 where the user's additional financial information is collected. This additional information includes other retirement accounts, debts (e.g., mortgage payment and years left on mortgage), monthly bills, and current assets. Determining operation 320 determines a salary needed for a second career in order to meet the user's retirement goals established in receiving operation 302 (e.g., age of retirement, standard of living).

Revising operation 322 revises military retirement income factors (e.g., military retirement date, payout timeframes). Revising operation 322 may be in response to detecting that the salary determined in determining operation 320 is above a threshold, when it appears that altering the payout schedule (e.g., taking a different percentage as a lump sum) would be beneficial for the user, or under other circumstances. In some embodiments, revising operation 322 occurs as a matter of course so that the user can see how altering the military retirement date and/or the payout schedule may change their finances. Recalculating operation 324 re-calculates military retirement income and the salary needed for the user's second career based on the revised military retirement income factors. Presenting operation 326 presents various military retirement factors and results of the re-calculations. The results may be presented on a user interface. Transitioning operation 328 transitions the user to a military separation tool to assist the user in preparing for separation from the military and back to civilian life.

Figure 4:
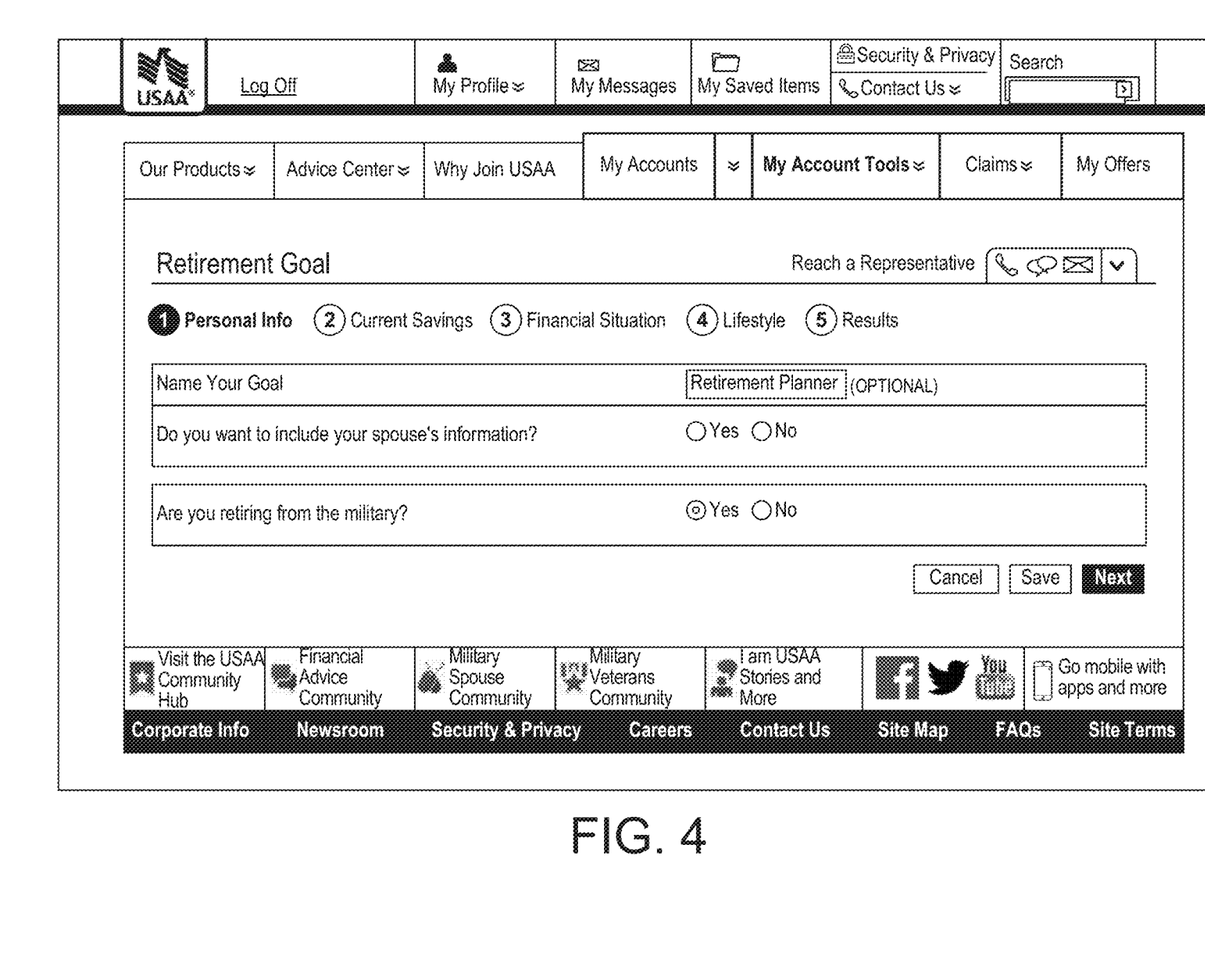
FIG. 4 is a user interface in accordance with various embodiments of the disclosure.
Figure 5:
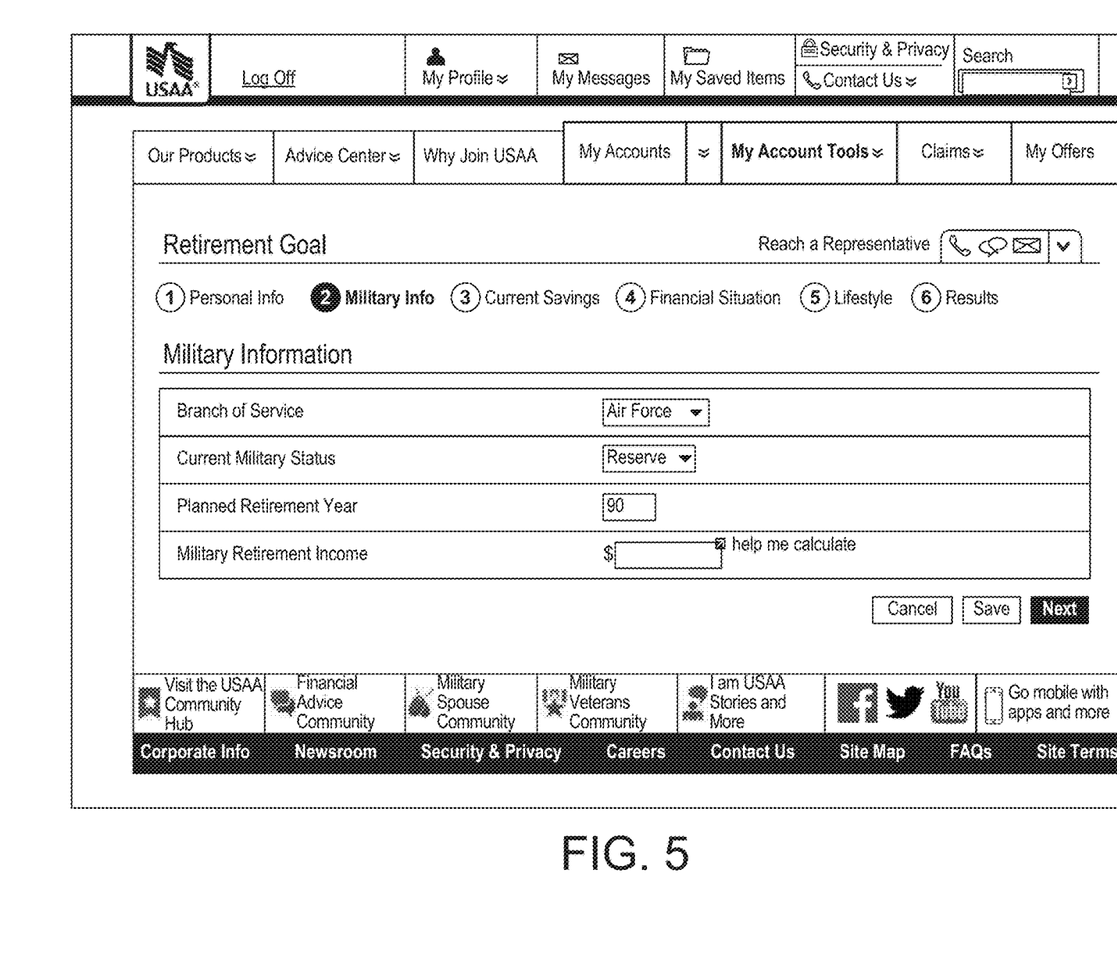
FIG. 5 is a user interface in accordance with various embodiments of the disclosure.
Figure 6:
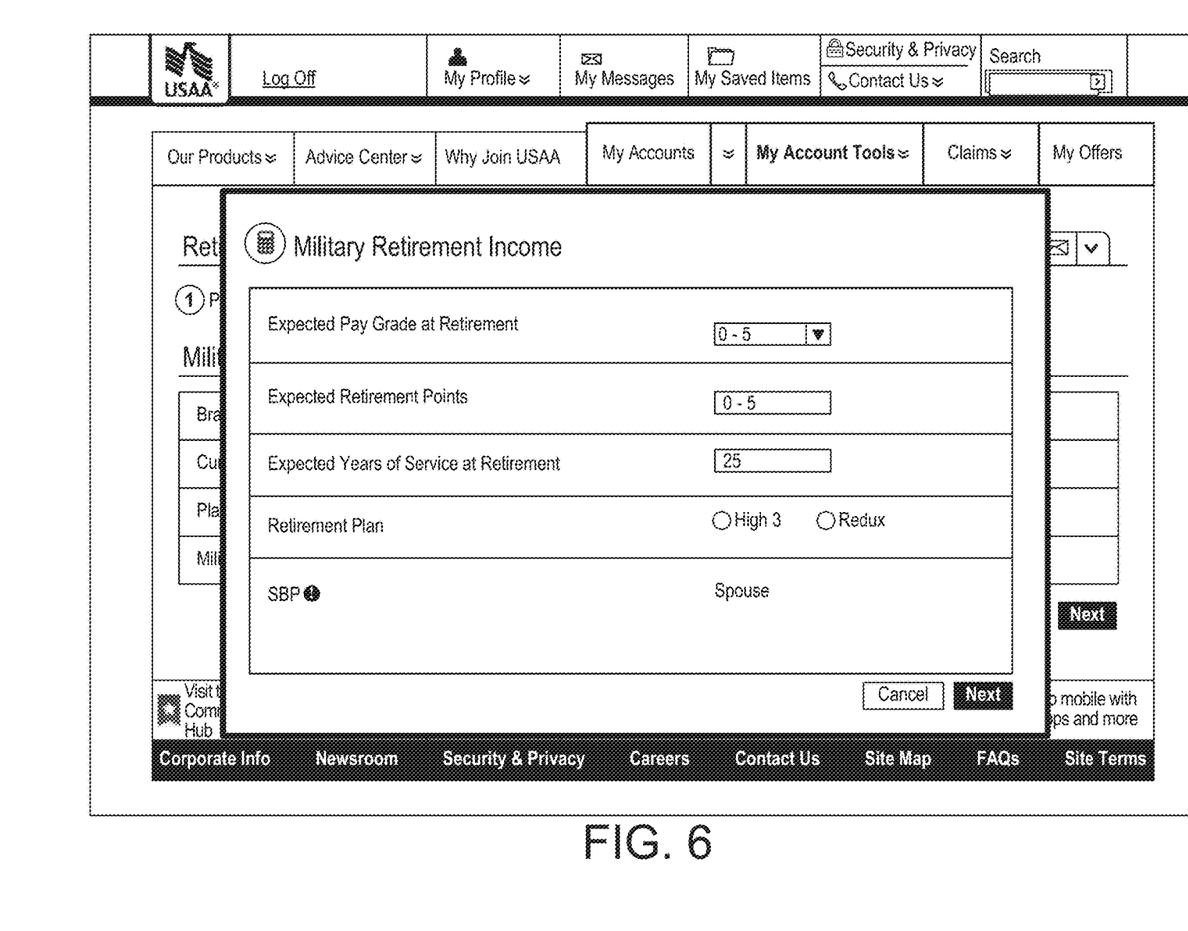
FIG. 6 is a user interface in accordance with various embodiments of the disclosure.

FIGS. 4-6 depict interfaces that may be used in embodiments of the present disclosure. FIG. 4 depicts a user interface in which a user can select that the user is planning to retire from the military. FIG. 5 depicts a user interface in which a user can input factors regarding his or her military career. If the user needs assistance calculating military retirement income, the user can select "help me calculate." FIG. 6 depicts a user interface illustrating information requested to estimate military retirement income.

Computer System Overview

Figure 7:
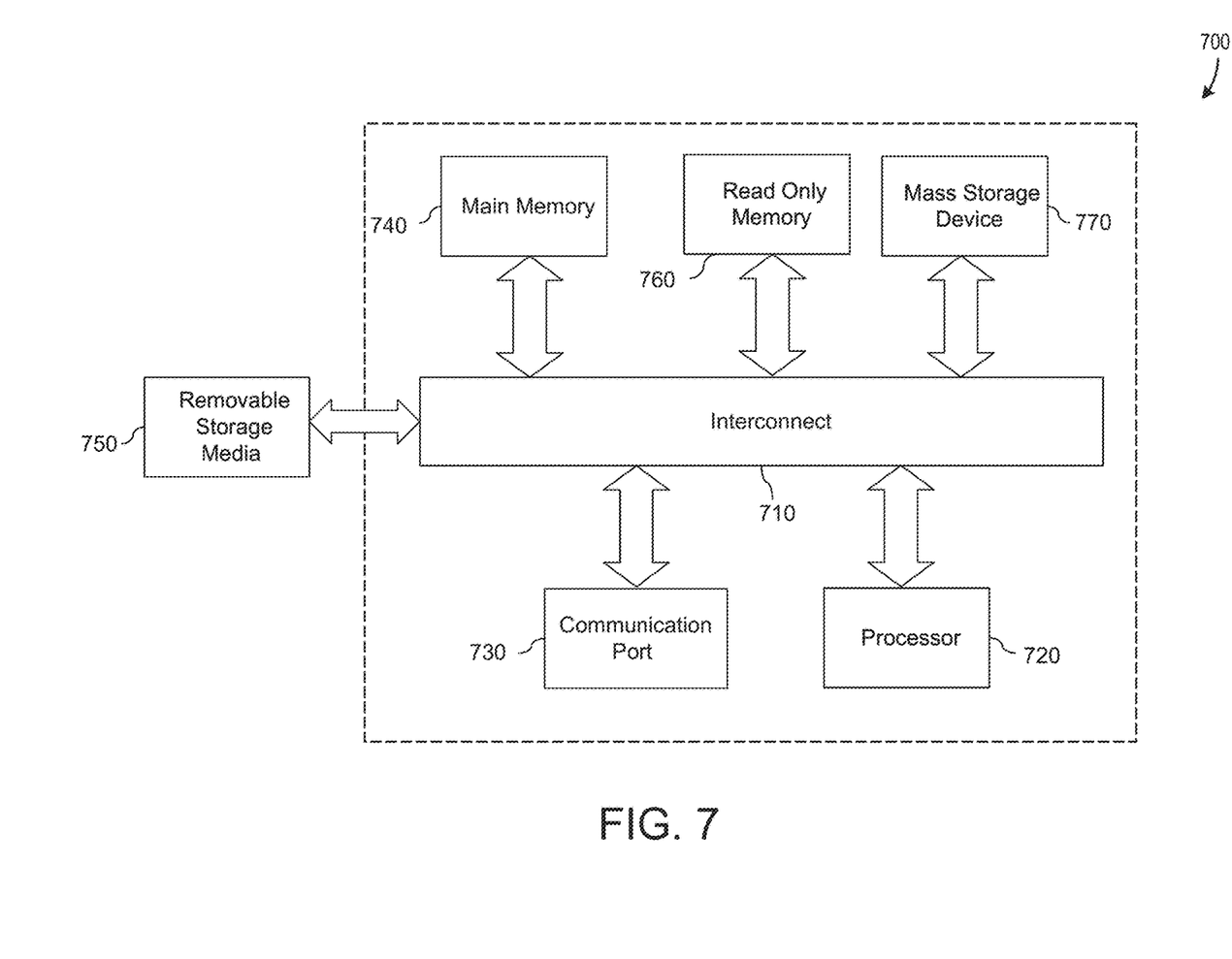
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes an interconnect 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such a Local Area Network (LAN), Wide Area Network (WAN), or any network to which the computer system 700 connects.

Main memory 740 can be random access memory (RAM) or any other dynamic storage device(s) commonly known in the art. Read only memory 760 can be any static storage device(s) such as programmable read only memory (PROM) chips for storing static information, such as instructions for processor 720.

Mass storage 770 can be used to store information and instructions. For example, hard disks such as the Adaptec® family of SCSI drives, an optical disk, an array of disks such as RAID, the Adaptec® family of RAID drives, or any other mass storage devices may be used.

Interconnect 710 communicatively couples processor(s) 720 with the other memory, storage, and communication blocks. Interconnect 710 can be a PCI/PCI-X- or SCSI-based system bus, depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network"

is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for planning for retirement from a first career when a second career is contemplated. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computerized method comprising:
   receiving, via a network from a computer device associated with a user, retirement goals;
   determining whether the user is an enlisted military member;
   in response to the user being the enlisted military member:
      recording, by a processor, a branch of service, current military status, and a planned year of retirement from the military;
      determining, by the processor, expected military retirement income based on the planned year of retirement from the military, years of service at the planned year of retirement from the military, and a military retirement annuity payment schedule;
      combining the expected military retirement income with retirement assets outside of the expected military retirement income;
      determining, by the processor, a salary for a second career to meet the retirement goals based at least in part on the expected military retirement income and the retirement assets outside of the expected military retirement income;
      in response to detecting that the salary for the second career is above a threshold, automatically revising, by the processor, an expected military retirement date to an earlier or later expected military retirement date;
      in response to detecting that the salary for the second career is above Hall the threshold, recommending, by the processor, modifications to the military retirement annuity payment schedule;
      updating, by the processor, the expected military retirement income with the earlier or later expected military retirement date;
      updating, by the processor, the expected military retirement income with the modifications to the military retirement annuity payment schedule,
      determining a new salary for the second career to meet the retirement goals based on the earlier or later expected military retirement date and updated military retirement information, wherein determining the new salary to meet the retirement goals is further based on the modifications to the military retirement annuity payment schedule;
      displaying, on a user interface, the earlier or later expected military retirement date and the new salary for the second career; and
      directing, by the processor, the user to a military separation tool.

2. The computerized method of claim 1, wherein the expected military retirement income is further based on expected pay grade at retirement and expected retirement points.

3. The computerized method of claim 1, wherein the retirement goals include a standard of living and a retirement date or age.

4. The computerized method of claim 1, further comprising recommending a revised military retirement date and a revised military retirement annuity payment schedule based on the retirement goals and the salary for the second career.

5. A non-transitory computer-readable storage medium comprising a set of instructions that, when executed by one or more processors, cause a machine to:
   receive, from a computer device associated with a user, retirement goals;
   determine whether the user is an enlisted military member;
   in response to the user being the enlisted military member:
      record a branch of service, current military status, and a planned year of retirement from the military;
      determine expected military retirement income based on the planned year of retirement from the military, years of service at the planned year of retirement from the military, and a military retirement annuity payment schedule;
      combine the expected military retirement income with retirement assets outside of the expected military retirement income;
      determine a salary for a second career to meet the retirement goals based at least in part on the expected military retirement income and the retirement assets outside of the expected military retirement income;
      in response to detecting that the salary for the second career is above a threshold, automatically revise an expected military retirement date to an earlier or later expected military retirement date;

in response to detecting that the salary for the second career is above the threshold, recommend modifications to the military retirement annuity payment schedule;

update the expected military retirement income with the earlier or later expected military retirement date;

update the expected military retirement income with the modifications to the military retirement annuity payment schedule, determine a new salary for the second career to meet the retirement goals based on the earlier or later expected military retirement date and updated military retirement information, wherein determining the new salary to meet the retirement goals is further based on the modifications to the military retirement annuity payment schedule;

display, on a user interface, the earlier or later expected military retirement date and the new salary for the second career; and cause the machine to direct the user to a military separation tool.

6. The non-transitory computer-readable storage medium of claim 5, wherein the expected military retirement income is further based on expected pay grade at retirement and expected retirement points.

7. The non-transitory computer-readable storage medium of claim 5, wherein the retirement goals include a standard of living and a retirement date or age.

8. The non-transitory computer-readable storage medium of claim 5, wherein the set of instructions that, when executed by the one or more processors, further cause the machine to recommend a revised military retirement date and a revised military retirement annuity payment schedule based on the retirement goals and the salary for the second career.

9. A retirement planning platform, comprising:
one or more processors; and
a computer-readable storage medium having instructions stored thereon which, when executed by the one or more processors, cause the retirement planning platform to:
receive, from a computer device associated with a user, retirement goals;
determine whether the user is an enlisted military member,
in response to the user being the enlisted military member:
record a branch of service, current military status, and a planned year of retirement from the military;
calculate expected military retirement income based on the planned year of retirement from the military, years of service at the planned year of retirement from the military, and a military retirement annuity payment schedule;
combine the expected military retirement income with retirement assets outside of the expected military retirement income;
determine a salary for a second career to meet the retirement goals based at least in part on the expected military retirement income and the retirement assets outside of the expected military retirement income;
in response to detecting that the salary for the second career is above a threshold, automatically revise an expected military retirement date to an earlier or later expected military retirement date;
in response to detecting that the salary for the second career is above a threshold, recommend modifications to the military retirement annuity payment schedule;
update the expected military retirement income with the earlier or later expected military retirement date;
update the expected military retirement income with the modifications to the military retirement annuity payment schedule,
determine a new salary for the second career to meet the retirement goals based on the earlier or later expected military retirement date and updated military retirement information, wherein determining the new salary to meet the retirement goals is further based on the modifications to the military retirement annuity payment schedule;
display, on a user interface, the earlier or later expected military retirement date and the new salary for the second career; and
cause the retirement planning platform to direct the user to a military separation tool.

10. The retirement planning platform of claim 9, wherein the retirement goals include a standard of living and a retirement date or age, and wherein the expected military retirement income is further based on expected pay grade at retirement and expected retirement points.

11. The retirement planning platform of claim 9, wherein the instructions, which when executed by the one or more processors, further cause the retirement planning platform to recommend a revised military retirement date and a revised military retirement annuity payment schedule based on the retirement goals and the salary for the second career.

* * * * *